(12) United States Patent
He et al.

(10) Patent No.: US 11,694,351 B2
(45) Date of Patent: *Jul. 4, 2023

(54) VEHICLE POSITIONING METHOD AND SYSTEM BASED ON LASER DEVICE

(71) Applicant: Beijing Trunk Technology Co., Ltd., Beijing (CN)

(72) Inventors: Bei He, Beijing (CN); Tianlei Zhang, Beijing (CN); Heyun Liu, Beijing (CN); Siyi Zheng, Beijing (CN)

(73) Assignee: Beijing Trunk Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/677,986

(22) Filed: Feb. 22, 2022

(65) Prior Publication Data

US 2022/0180542 A1 Jun. 9, 2022

Related U.S. Application Data

(63) Continuation of application No. 16/876,388, filed on May 18, 2020, now Pat. No. 11,282,219.

(30) Foreign Application Priority Data

May 23, 2019 (CN) .......................... 201910436285.6

(51) Int. Cl.
*G06T 7/521* (2017.01)
*G06T 7/277* (2017.01)
*G06T 7/557* (2017.01)
*G06V 10/44* (2022.01)

(52) U.S. Cl.
CPC .............. *G06T 7/521* (2017.01); *G06T 7/277* (2017.01); *G06T 7/557* (2017.01); *G06V 10/443* (2022.01); *G06T 2207/10028* (2013.01)

(58) Field of Classification Search
CPC ......... G06T 7/521; G06T 7/277; G06T 7/557; G06T 2207/10028; G06V 10/443; G01S 7/4808; G01S 17/42; G01S 17/931
See application file for complete search history.

(56) References Cited

U.S. PATENT DOCUMENTS

| 10,782,409 B2* | 9/2020 | Wang | G01S 17/89 |
| 11,282,219 B2* | 3/2022 | He | G01S 17/931 |
| 2015/0293225 A1* | 10/2015 | Riley | G05D 1/104 |
| | | | 356/4.01 |

* cited by examiner

*Primary Examiner* — John B Strege
(74) *Attorney, Agent, or Firm* — Fideli Law PLLC

(57) ABSTRACT

The present application discloses a positioning method for a movable platform, including: detecting, by a laser positioning system (LPS) mounted on the movable platform, a plurality of reflectors mounted on a target object, wherein the movable platform is moving; calculating in real-time, by the LPS, according to the current position information, relative positions of the plurality of reflectors with respect to the LPS; and obtaining, by the LPS, a relative position of the movable platform with respect to the target object based on the relative positions of the plurality of reflectors with respect to the LPS. The present application also discloses positioning system that performs the positioning method.

20 Claims, 12 Drawing Sheets

800

| The current position information of each reflecting pillar relative to the laser device may be obtained via real-time detecting the plurality of reflecting pillars amounted on the alignment target by using a laser device disposed on the vehicle | ~ 801 |

| The vehicle position of the vehicle with respect to the alignment target may be obtained based on current position information, the alignment coordinate system of the preset reflecting pillar cluster, and the actual position information of each of the plurality of reflecting pillars | ~ 802 |

FIG. 8

VEHICLE POSITIONING METHOD AND SYSTEM BASED ON LASER DEVICE

RELATED APPLICATION

The present application is a continuation application of application Ser. No. 16/876,388, which claims the benefit of priority to Chinese Patent Application No. CN201910436285.6, filed May 23, 2019, and entitled "Vehicle Positioning Method and System Based on Laser Device," the entire contents of which are incorporated herein by reference.

TECHNICAL FIELD

This present disclosure generally relates to systems and methods for position determination, and more particularly, to methods and systems for position determination for an autonomous vehicle.

BACKGROUND

With the development of autonomous driving technology, more and more closed or semi-open working environments, including the port environment, have begun to use the autonomous driving technology to assist and support the operation process of the closed or semi-open working environments. A key advantage of the machine is its ability to carry out 24 hours 7 days a week of uninterrupted work. Thus, for efficiency improvement and cost control, using unmanned container trucks to conduct port operations has become a future trend and an important means of replacing the traditional port manual operation. During this replacement, vehicle positioning occupies an important position in unmanned vehicle operations.

At present, most vehicle positioning methods are to set sensors on the loading and unloading equipment to detect the position of the vehicle during the container loading and unloading process, then extract information of the head, trailer and container part of the container truck by extracting straight lines, rectangles, and then reverse calculate the location of the vehicle using the cloud server. However, this positioning method of remote feedback calculation cannot satisfy the precise positioning of the vehicle itself during the continuous travel.

SUMMARY

According to an aspect of the present application, a positioning system includes a movable platform; a Lidar mounted on the movable platform to detect a plurality of reflectors mounted on a target object while the movable platform is moving, wherein each of the plurality of reflectors includes a reflective pillar; and at least one processor mounted on the movable platform and in communication with the Lidar and the movable platform to: obtain in real-time, according to the current position information, relative positions of the plurality of reflectors with respect to the Lidar by: determining a plurality of cloud points for a reflector, performing a coarse filtering on the plurality of cloud points to generate a coarse cloud point cluster, performing a fine filtering on the coarse cloud point cluster to generate a fine cloud point cluster, and determining the position of the reflector based on the fine cloud point cluster, and obtain a relative position of the movable platform with respect to the target object based on the relative positions of the plurality of reflectors with respect to the Lidar.

According to another aspect of the present application, a positioning method for a movable platform includes detecting, by a laser positioning system (LPS) mounted on the movable platform, a plurality of reflectors mounted on a target object, wherein the movable platform is moving, and each of the plurality of reflectors includes a reflective pillar; obtaining in real-time, by the LPS according to the current position information, relative positions of the plurality of reflectors with respect to the LPS by: determining a plurality of cloud points for a reflector, performing a coarse filtering on the plurality of cloud points to generate a coarse cloud point cluster, performing a fine filtering on the coarse cloud point cluster to generate a fine cloud point cluster, and determining the position of the reflector based on the fine cloud point cluster, and obtaining, by the LPS, a relative position of the movable platform with respect to the target object based on the relative positions of the plurality of reflectors with respect to the LPS.

BRIEF DESCRIPTION OF THE DRAWINGS

The present disclosure is further described in terms of exemplary embodiments. The foregoing and other aspects of embodiments of the present disclosure are made more evident in the following detail description, when reading in conjunction with the attached drawing figures.

FIG. 8 is a flowchart illustrating an exemplary process for positioning method for a movable platform according to some embodiments of the present disclosure.

DETAILED DESCRIPTION

Figure 1:
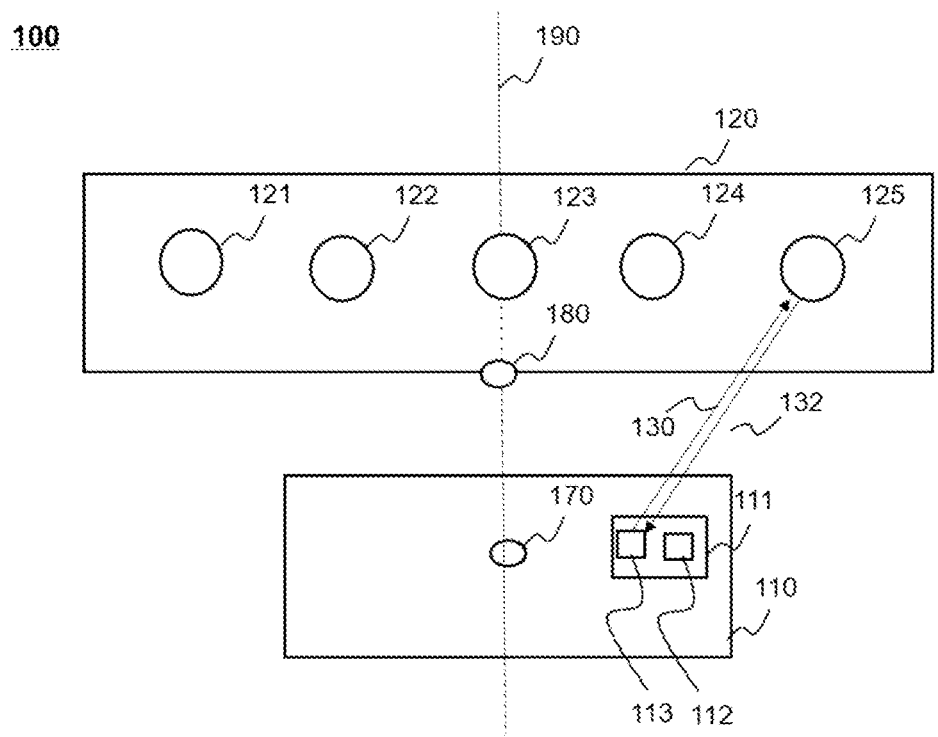
FIG. 1 is a schematic diagram illustrating an exemplary system for movable platform positioning according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to what the embodiments show, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form a part of this specification. It is to be expressly understood, however, that the drawing(s) is for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order or simultaneously. Moreover, one or more other operations may be added to the flowcharts. One or more operations may be removed from the flowcharts.

FIG. 1 is a schematic diagram illustrating an exemplary system for movable platform positioning according to some embodiments of the present disclosure. The system 100 may include a laser positioning system (LPS) 111 mounted on a movable platform 110. The system 100 may be implemented to use a plurality of reflectors (e.g., 121, 122, 123, 124 or 125 as shown in FIG. 1) mounted on a target object 120 as references for positioning the movable platform 110. For example, the target object 120 may be an alignment target, i.e., a target that the movable platform 110 may align with. The movable platform 110 may be anything that is movable, and the target object 120 may be a reference object when the movable platform park. For example, when the movable platform 110 is an autonomous navigating container truck in a port, the target object may be a crane to load a container to the truck. As another example, when the movable platform 110 is an autonomous cleaning robot to vacuum a floor, the target object may be a dock for the cleaning robot to charge its battery.

Figure 3:
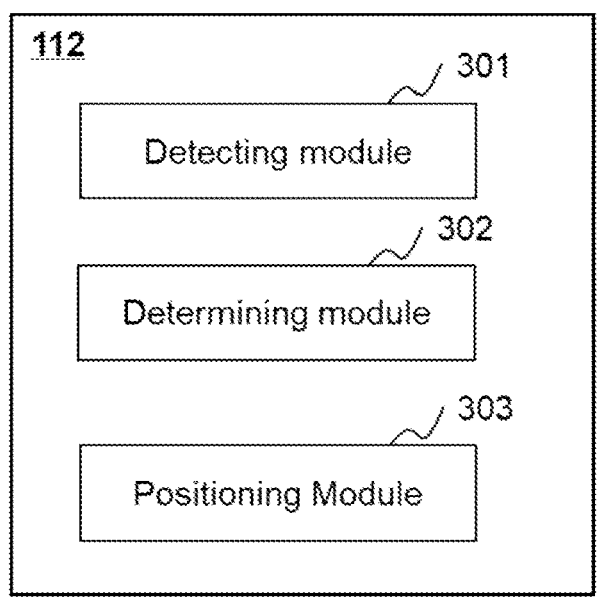
FIG. 3 is a schematic diagram illustrating exemplary hardware and/or software components of an exemplary processing engine according to some embodiments of the present disclosure.

The LPS 111 may include a Lidar 113 and a processing engine 112. The processing engine 112 (e.g., detecting module 301) may detect the plurality of reflectors (e.g., 121, 122, 123, 124 or 125 as shown in FIG. 1) mounted on the target object 120. The Lidar 113 may emit one or more laser beams 130 and scan the one or more laser beams 130 to the plurality of reflectors. The plurality of reflectors may reflect the laser beam 130 to the LPS 111. The LPS (e.g., the processing engine 112 or the detecting module 301 as shown in FIG. 3) may detect the plurality of reflectors via receiving laser reflections 132 (a.k.a., the reflected laser beam 132 of the laser beam 130) from the plurality of reflectors.

A reflector (e.g., 121, 122, 123, 124 or 125 as shown in FIG. 1) may be a reflective pillar or a reflecting tag. The reflector may be made by reflecting materials. In some embodiments, the reflector may be a pillar wrapped by reflecting tapes or painted by reflecting paints, etc. The reflector may be made in a certain shape. For example, the reflector may be a column, a cube, a ball, a square sheet, a circular sheet, an irregular-shape sheet, or the like, or any combination thereof. The processing engine 112 may receive the laser reflections 132 of a reflector and generate a point cloud corresponding to the reflector. Accordingly, the point cloud may include information of the reflector. For example, the point cloud may reflect the shape of the reflector. Based on the point cloud, the processing engine 112 may determine the position of the reflector. To this end, the processing engine 112 may first determine shape-related parameters of the reflector, and then, based on the shape-related parameters, the processing engine 112 may determine a coordinate that mostly represents the location of the reflector. For example, if the reflector is a column or a pillar, the processing engine 112 may determine a plurality of parameters related to a center point, a centerline and/or a radius of the reflector, and then use the plurality of parameters to determine the coordinate of the pillar.

The plurality of reflectors may be arranged in a certain known or predetermined pattern on the target object in order for the system 100 to position. For example, the plurality of reflectors may be arranged in a row on the target object. A distance of two reflectors may be a predetermined value (e.g., 1 meter, 0.5 meter, 0.1 meter, etc.).

The target object 120 may include a reference point 180. The reference point 180 may be related to a geometric structure of the target object 120. For example, the reference point 180 may be a geometric center of the target object 120. In some embodiments, the reference point 180 may be related to a functional structure of the target object 120. For example, if the target object 120 may be a gantry crane (or a portal cane, etc.), then the reference point 180 may be related to a position of the crane or a wheel of the gantry crane. The movable platform 110 may include an alignment point 170. The alignment point 170 may be related to a geometric structure of the movable platform 110. For instance, the movable platform 110 may be a vehicle, and the alignment point 170 may be a geometric center of the movable platform 110 along the length of the movable platform 110. For another instance, the movable platform 110 may include a vehicle and a container carried or towed by the vehicle, and the alignment point 170 may be a geometric center of the container in the length direction. The relative positions of the movable platform with respect to the target object may be obtained by the LPS 111 may be considered as relative positions of the reference point of the movable platform with respect to the reference point of the target object.

After the relative positions of the movable platform 110 with respect to the target object 120 are obtained by the LPS 111, the movable platform 110 may move to align with the target object 120 based on the relative positions of the movable platform with respect to the target object. At a target position where the movable platform 110 is aligned with the target object 120, the reference point of the target object 120 and the alignment point on the movable platform 110 may form a certain pattern by the alignment. For example, as shown in FIG. 1, after the alignment, the reference point 180 of the target object 120 and the alignment point 170 of the movable platform 110 may form a line 190. Line 190 may be perpendicular to the target object 120. If the target object 120 is the gantry crane and movable platform 110 includes a container, the crane may lift the container from the movable platform 110.

Figure 2:
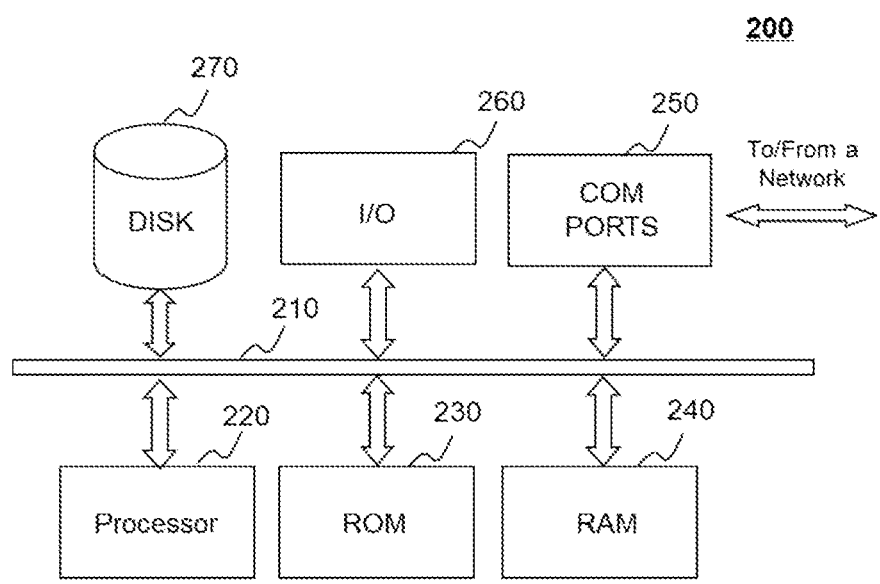
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. The server 110, the terminal 130, and/or the database 140 may be implemented on the computing device 200 according to some embodiments of the present disclosure. The particular system may use a functional block diagram to explain the hardware platform containing one or more user interfaces. The computer may be a computer with general or specific functions. Both types of computers may be configured to implement any particular system according to some embodiments of the present disclosure. The computing device 200 may be configured to implement any component that may perform one or more functions disclosed in the present disclosure. For example, the computing device 200 may be used to implement any component of the system 100 as described herein. Only one such computer device is shown purely for convenience purposes. One of ordinary skill in the art would understand at the time of filing of this application that the computer functions relating to the service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or other types of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus, operations and/or method steps performed by one CPU and/or processor as described in the present disclosure may also be jointly or separately performed by the multiple CPUs and/or processors. For example, if in the present disclosure the CPU and/or processor of the computing device 200 executes both steps A and B, it should be understood that step A and step B may also be performed by two different CPUs and/or processors jointly or separately in the computing device 200 (e.g., the first processor executes step A and the second processor executes step B or the first and second processors jointly execute steps A and B).

FIG. 3 is a block diagram illustrating an exemplary processing engine 112 according to some embodiments of the present disclosure. The processing engine 112 may include a detecting module 301, a determining module 302, a positioning module 303.

The detecting module 301 may determine a plurality of reflectors mounted on a target object that is detected by a laser positioning system (LPS) mounted on the movable platform. In some embodiments, the movable platform may be moving.

As illustrated in FIG. 1, the LPS 111 may include a Lidar 113 and a processing engine 112. The processing engine 112 (e.g., detecting module 301) may detect the plurality of reflectors (e.g., 121, 122, 123, 124 or 125 as shown in FIG. 1) mounted on a target object 120 mounted on the movable platform 110. The Lidar 113 may emit one or more laser beams and scan the one or more laser beams to the plurality of reflectors. The plurality of reflectors may reflect the laser beams to the LPS 111. The detecting module 301 may detect the plurality of reflectors via receiving these laser reflections from the plurality of reflectors.

The detecting module 301 may detect the plurality of reflectors (e.g., 121, 122, 123, 124 or 125 as shown in FIG. 1) mounted on the target object 120, which may be mounted on the movable platform 110. The Lidar 113 may emit one or more laser beams and scan the one or more laser beams to the plurality of reflectors. The plurality of reflectors may reflect the laser beams to the LPS 111. The detecting module 301 may detect the plurality of reflectors via receiving these laser reflections (i.e., the one or more laser beams reflected by the plurality of reflectors) from the plurality of reflectors.

Then, the determining module 302 may obtain relative positions of the plurality of reflectors with respect to the LPS 111.

The determining module 302 may obtain relative positions of the plurality of reflectors with respect to the LPS 111 based on the laser reflections from the plurality of reflectors. The plurality of reflectors may reflect the laser beam emitted by the Lidar to the LPS 111. One or more characteristics of the laser reflections may be related to the relative positions of the plurality of the reflector with respect to the LPS 111. One or more characteristics of the laser reflections may include the intensity of the reflection or an angle of the reflection. For instance, the intensities of laser reflections may be negatively related to the distances from the reflector to the LPS 111. The Lidar may emit a laser as a first signal, and the determining module 302 may receive the laser reflection as a second signal. By comparing the intensity of the first signal and the intensity of the second signal, the determining module 302 may determine a surface color/texture of the reflector. By comparing the time difference between the emitting of the first signal and receiving of the second signal, the determining module 302 may determine a relative position of the reflector with respect to the LPS 111.

The positioning module 303 may obtain relative positions of the movable platform with respect to the target object. The plurality of reflectors may be mounted on the target object. The actual position of the plurality of reflectors on the target object is known. The position of the LPS 111 on the movable platform is also known. The positioning module 303 may obtain relative positions of the movable platform with respect to the target object based on the relative positions of the plurality of reflectors with respect to the LPS 111, the position of the LPS 111 on the movable platform, and the position of the plurality of reflectors on the target object.

It should be noted that the descriptions above in relation to the processing engine 112 are provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, the processing engine 112 may further include a storage module (not shown in FIG. 3). The storage module may be configured to store data generated during any process performed by any component of the processing engine 112. As another example, each of the components of the processing engine 112 may associate with a storage module. Additionally or alternatively, the components of the processing engine 112 may share a common storage module. Similar modifications should fall within the scope of the present disclosure.

Figure 4:
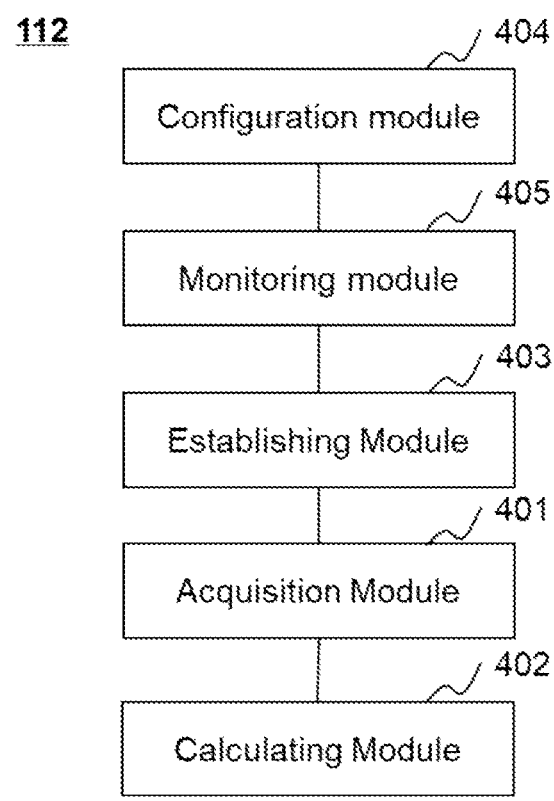
FIG. 4 is a block diagram illustrating another exemplary laser positioning system according to some embodiments of the present disclosure.

FIG. 4 is a block diagram illustrating another exemplary Laser Positioning System (LPS) 111, according to some embodiments of the present disclosure. Other than the Lidar 113 (not shown in FIG. 4), the processing engine 112 may include an acquisition module 401, a calculating module 402, an establishing module 403, a configuration module 404, and a monitoring module 405.

The acquisition module 401 may be configured to operate a real-time detection on the plurality of reflectors disposed on an alignment target (e.g., the target object 120 as shown in FIG. 1) to obtain current position information of each of the reflective pillars (e.g., the plurality of reflectors as shown in FIG. 1) relative to a laser device using the laser device (e.g. the LPS 111 as shown in FIG. 1) preset on the device to be aligned in real-time by the laser device installed on the vehicle. The calculation module 402 may be configured to determine the relative position of the vehicle with respect to the alignment target (e.g., the target object 120 as shown in FIG. 1) according to current position information, a preset coordinate system of the reflective pillar cluster, and the actual position information of each of the reflective pillar.

The invention can quickly determine the vehicle position of the vehicle relative to the alignment target (e.g., the target object 120 as shown in FIG. 1) according to the current position information in real-time, and satisfies the precise positioning of the vehicle itself during the continuous traveling of the vehicle.

Further, in some embodiments, the processing engine 112 may include the establishing module 403.

The establishing module 403 may be configured to acquire position information of each of the reflective pillars relative to the laser device and a motion state of the vehicle in real-time during the movement of the different postures of the vehicle, and establish an alignment coordinate system based on the position information and the motion state, wherein the alignment coordinate system is a coordinate system on the vehicle for aligning the vehicle with the target object at the target position.

Further, the establishing module 403 may further be configured to operate the following: When the position information of at least two reflective pillars relative to the laser device is obtained for the first time, the nearest reflective pillar from the laser device is taken as the origin of the coordinate system, and the other reflective pillars are taken as the intersection points on the X-axis to establish the first pair of coordinate systems of the current vehicle running position. The X-axis coordinates of each reflecting column in the current coordinate system are sorted and numbered. The establishing module 403 may establish a first alignment coordinate system of the current vehicle position, and sort X-axis coordinates of each reflective pillar in the current alignment coordinate system.

When the position information of the at least two reflective pillars relative to the laser device (e.g., the Lidar 113) is acquired again, the reflective pillar closest to the laser device is taken as the origin of the coordinate system, and the other reflective pillars are used as the intersection point on the X-axis to establish the second alignment position of the current vehicle running position. The establishing module 403 may use a neighbor algorithm to associate the second alignment coordinate system with the first alignment coordinate system according to the current vehicle motion state to obtain a third alignment coordinate system;

During the movement of the vehicle with different postures, the establishment and association of the coordinate system are continuously performed until a preset requirement is met to establish the alignment coordinate system.

Further, in some embodiments, the processing engine 112 may include a setting module 404. The setting module 404 may be configured to acquire parameter information of the laser device (e.g., the Lidar 113) before establishing the alignment coordinate system, which is based on the position information and the motion state of the setting module 404 (i.e., the motion state of the vehicle or movable platform).

Further, in some embodiments, the processing engine 112 may further include a monitoring module 405;

The detection module 405 may be configured to detect the reflector after setting; Specifically, the reflectivity and distance characteristics of each reflective pillar are obtained, and the reflectivity characteristics are coarsely filtered according to the preset threshold. According to the distance feature, the reflectivity feature after coarse filtration is filtered and the cluster points of each reflector are obtained by clustering. The cluster points of each reflective column are fitted with a cylinder respectively, and the parameters of the cylinder are retained.

In order to reduce noise interference, in some embodiments, the processing engine 112 may further include a filtering module. The filtering module may be configured to determine a Kalman filtering model according to a vehicle after calculating a position of the vehicle relative to the alignment target (e.g., the target object 120 as shown in FIG. 1). The vehicle position is filtered to obtain the filtered vehicle position.

It should be noted that the descriptions above in relation to the LPS 111 or processing engine 112 are provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, the processing engine 112 may further include a storage module (not shown in FIG. 4). The storage module may be configured to store data generated during any process performed by any component of the processing engine 112. As another example, each of the components of the processing engine 112 may associate with a storage module. Additionally or alternatively, the components of the processing engine 112 may share a common storage module. Similar modifications should fall within the scope of the present disclosure.

Figure 5A:
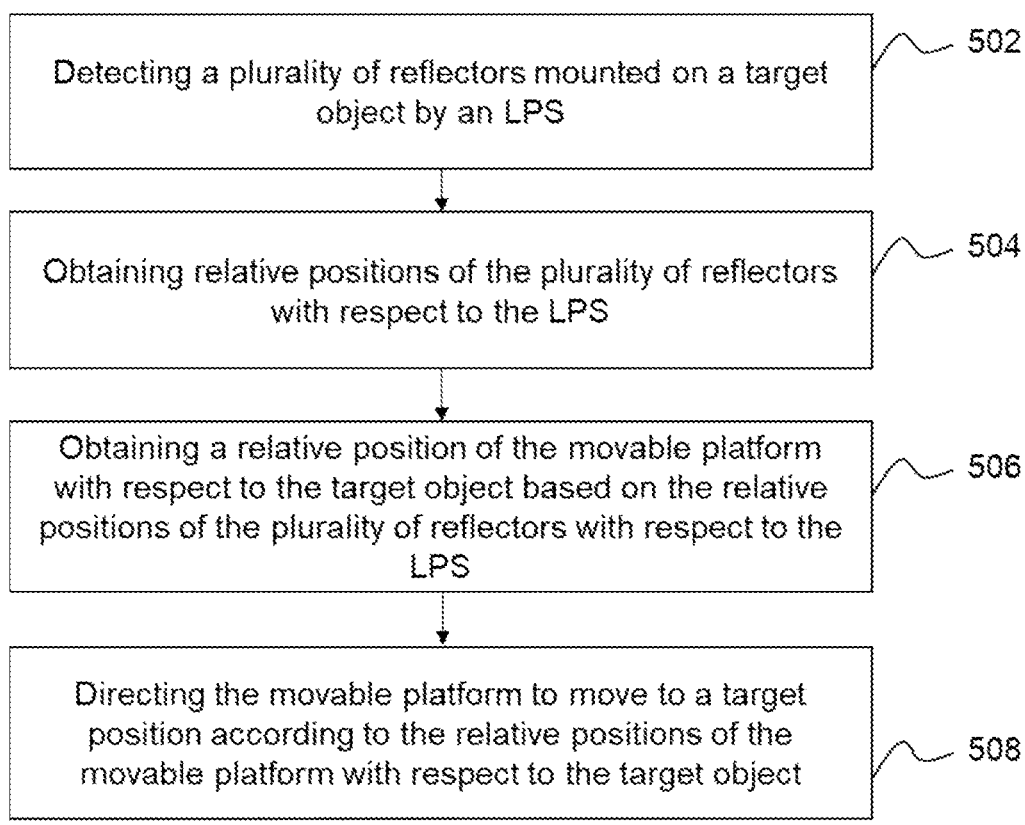
FIG. 5A is a flowchart illustrating an exemplary process for positioning method for a movable platform according to some embodiments of the present disclosure.

FIG. 5A is a flowchart illustrating an exemplary process for positioning method for a movable platform according to some embodiments of the present disclosure. The process 500 may be executed by the system 100. For example, the process 500 may be implemented as a set of instructions (e.g., an application) stored in a storage device (e.g., the ROM 230 or the RAM 240) and invoked and/or executed by the processing engine 112 (e.g., the processor 220 of the computing device 200 illustrated in FIG. 2 and/or the modules and/or units illustrated in FIG. 3). The processing engine 112 may execute the set of instructions and, when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5A and described below is not intended to be limiting.

In 502, a plurality of reflectors mounted on a target object may be detected by the laser positioning system (LPS) 111 mounted on the movable platform 110. In some embodiments, the movable platform 110 may be moving. For example, the movable platform may be a truck, a car, a hitch, a bus, a train, a subway, a vessel, an aircraft, an autonomous vehicle, or the like, or any combination thereof. For another instance, the movable platform 110 may include a vehicle and a container carried or towed by the vehicle.

As illustrated in FIG. 1, the LPS 111 may include a Lidar 113 and a processing engine 112. The processing engine 112 (e.g., the detecting module 301 or the acquisition module 401) may detect the plurality of reflectors (e.g., 121, 122, 123, 124 or 125 as shown in FIG. 1) mounted on a target object 120 mounted on the movable platform 110. The Lidar 113 may emit one or more laser beams and scan these to the plurality of reflectors in real-time. The plurality of reflectors may reflect the laser beam to the LPS 111. The LPS 111 (e.g., the processing engine 112 or the detecting module 301) may detect the plurality of reflectors via receiving these laser reflections from the plurality of reflectors.

A reflector may be a reflective pillar or a reflecting tag. The reflector may be made in a certain shape. For example, the reflector may be a column, a cube, a ball, a square piece, a circular piece, an irregular shape, or the like, or any combination thereof. The processing engine 112 may receive the laser reflections of a reflector and generate a point cloud related to the reflector. Thus, the point cloud may be related to the shape of the reflector, and the plurality of reflectors may be arranged in a certain pattern on the target object. For example, the plurality of reflectors may be arranged in a row on the target object. Additionally, a distance of two reflectors may be a predetermined value (e.g., 1 meter, 0.5 meters, 0.1 meters, etc.).

The processing engine 112 may determine the shape-related parameters of the reflector. For example, if the reflector is a reflective pillar or a reflective pillar, the processing engine 112 may determine a plurality of parameters related to a center point, a centerline and a radius of the reflective pillar. The actual position and radius of the reflective pillar may be predetermined. For example, the radius and height may be determined by the maximum applicable distance of the LPS 111 (e.g., a laser radar).

The reflective pillar may be mounted horizontally upward. For instance, the plurality of reflective pillars may be mounted vertically to a horizontal plane, and geometric centers of the plurality of reflective pillars can share the same horizontal plane. A center plane of the reflective pillar may be near the center plane position of the LPS 111, which means the center plane of the reflective pillar may be a horizontal plan passing through the geometric center of the reflective pillar. Furthermore, the center plane of the LPS 111 may be a horizontal plan passing through the geometric center of the LPS 111. A vertical height of the center plane of the reflective pillar is substantially the same as a vertical height of the center plane of the LPS 111. This configuration may provide a robust signal accuracy and for positioning. In some embodiments, the reflective pillar can be calibrated. Specifically, for n reflective pillars, the radius $r_1, r_2, \ldots, r_n$ and the distance $d_{ij}$ between the center points of every 2 adjacent reflective pillars are measured, wherein $i \in [1, 2, \ldots, n]$, $j \in [1, 2, \ldots, n]$. In some embodiments, the reflective pillar may exist at least three laser lines generate by the LPS 111 at a certain position. A laser line (or a scanning line) may be a virtual or real line on the surface of the reflective pillar including at least three reflecting points arranged in the same horizontal plane. Each of the reflecting points may represent a position on the surface of the reflective pillar where the reflective pillar reflects a laser beam emitted by the LPS 111 from the certain position. The LPS 111 may determine the relative position information between LPS and the reflective pillar based on the laser beams reflected to the LPS 111 corresponding to a laser line. Thus one reflective pillar may provide at least three pieces of relative position information between the LPS and the reflective pillar based on the laser beams reflected to the LPS 111 corresponding to the at least three laser lines, by which the clustering process for the reflective pillar after mentioned may be accurate.

In 504, relative positions of the plurality of reflectors with respect to the LPS 111 may be obtained by the LPS 111. The processing engine 112 (e.g., the determining module 302 or the calculating module) may obtain relative positions of the plurality of reflectors with respect to the LPS 111.

The processing engine 112 (e.g., the determining module 302 or the calculating module 402) may obtain relative positions of the plurality of reflectors with respect to the LPS 111 based on the laser reflections 132 from the plurality of reflectors. The plurality of reflectors may reflect the laser beam 130 emitted by the Lidar to the LPS 111. One or more characteristics of the laser reflections 132 may be related to the relative positions of the plurality of the reflector with respect to the LPS 111. One or more characteristics of a laser reflection 132 may include the intensity of the reflections or an angle of the reflection. For instance, the intensity of the laser reflection 132 may have a negative correlation with the distance from the reflector to the LPS 111. The Lidar 113 may emit a laser beam 130 as a first signal, and the processing engine 112 may receive the laser reflection 132 as a second signal. By comparing the intensity of the first signal and the intensity of the second signal, the processing engine 112 may determine a difference of the intensities, thereby determining a relative position of the reflector with respect to the LPS 111.

The Lidar 113 may emit and scan a laser beam to the reflector and the LPS 111 may receive a reflected laser beam (the reflection) and generate cloud points signals for the reflected laser beam based on the reflecting intensity of each cloud point. In some embodiments, the processing engine 112 may obtain a reflectivity feature and a distance feature of each cloud point, and then perform coarse filtering on the reflectivity feature according to a preset threshold. In some embodiments, the coarse filtering satisfies the formula (1)

$$\{P_i | \text{intensity}_i \geq Thr\} \quad (1)$$

wherein $P_i$ denotes the ith cloud point. Intensity, denotes the reflecting rate of the ith could point. Thr denotes a preset threshold. The preset threshold may be K, and the value greater than or equal to K may be considered a reflector suspected area, and value less than k directly is directly filtered out.

The processing engine 112 may finely filter the coarse filtered reflectivity features according to their corresponding distance features, and then cluster the cluster points of each reflective pillar. The finely filtering may be performed based on formula (2)

$$\{P_i | Thr_l \leq \sqrt{x_i^2 + y_i^2 + z_i^2} \leq Thr_h\} \quad (2)$$

wherein $Thr_l$ denotes a minimum threshold, and $Thr_h$ denotes a maximum threshold, $x_i$ denotes X-axis coordinate of the ith cloud point, $y_i$ denotes y-axis coordinate of the ith cloud point, and $z_i$ denotes z-axis coordinate of the ith cloud point.

Figure 5B:
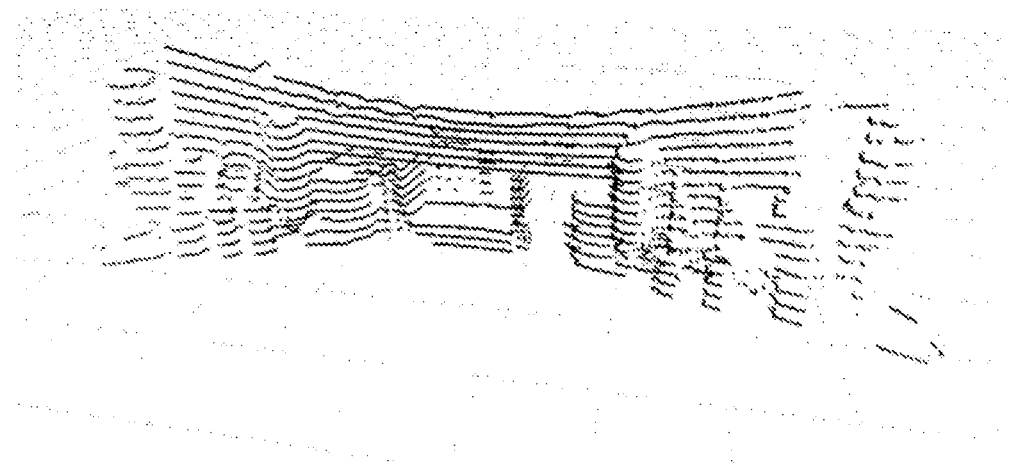
FIG. 5B is a schematic diagram illustrating cloud point cluster of a reflector before filtering.
Figure 5C:
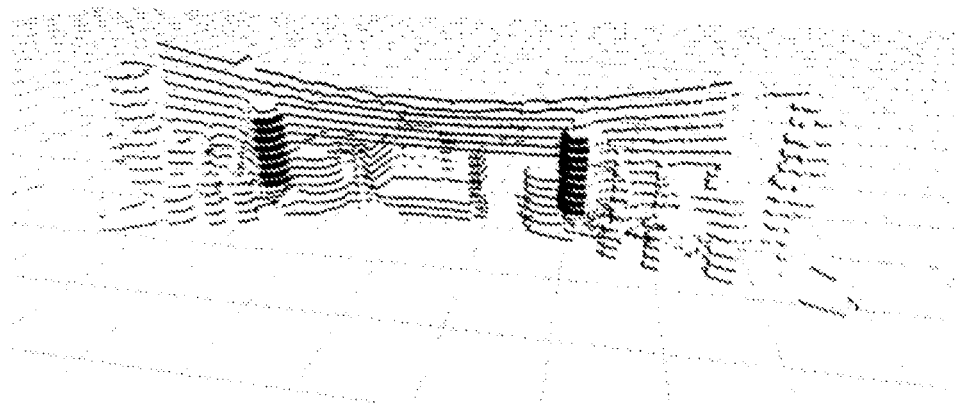
FIG. 5C is a schematic diagram illustrating cloud point cluster of a reflector after filtering.

The processing engine 112 may ignore the z-axis data for clustering of the x-y plane point cloud, and only keep the cluster with the distance less than $d_{min}$ and the number of point clouds in the cluster between $c_{min}$ and $c_{max}$, where d represents distance; $c_{min}$ represents the minimum number of points or point clouds in the cluster; and $c_{min}$ represents the maximum points or point clouds in the cluster. Since the volume of the reflective pillar is substantially unchangeable, the count of cloud points for one pillar may be in a certain range. Before the processing engine 112 may fine-filters the clustering as shown in FIG. 5B, after fine-filtering clustering, as shown in FIG. 5C, the reflector can be stably detected.

The processing engine 112 may fit the cluster points of each of the reflective pillars into a cylinder and retains the parameters of the cylinder. The parameters of the cylinder may include a center point ($c_{xi}$, $c_{yi}$, $c_{zi}$), a cylinder center line vector ($c_{vxi}$, $c_{vyi}$, $c_{vzi}$), and a cylinder bottom radius $c_{ri}$. Considering the presence of noises in the laser point cloud, the processing engine 112 may can also conduct a fit operation using a random consistent sampling algorithm.

In 506, the LPS 111 may obtain relative positions of the movable platform with respect to the target object. The processing engine 112 (e.g., the positioning module 303 in FIG. 3 or the acquisition module 401 and calculating module 402 in FIG. 4) may obtain relative positions of the movable platform with respect to the target object. The plurality of reflectors (i.e., the reflective pillars) may be mounted on the target object. The actual position of the plurality of reflectors on the target object is known. The position of the LPS 111 on the movable platform is also known. The processing engine 112 (e.g., the positioning module 303 in FIG. 3 or the acquisition module 401 and calculating module 402 in FIG. 4) may obtain the relative positions of the movable platform with respect to the target object based on the relative positions of the plurality of reflectors with respect to the LPS 111, the position of the LPS 111 on the movable platform, and the position of the plurality of reflectors on the target object.

For example, as shown in FIG. 1, the target object 120 may include a reference point 180. The reference point 180 may be related to a geometric structure of the target object 120. For example, the reference point 180 may be a geometric center of the target object 120. In some embodiments, the reference point 180 may be related to a functional structure of the target object 120. For example, the target object 120 may be a gantry crane (or a portal cane, etc.), and the reference point 180 may be related to a position of the crane of the gantry crane. The movable platform 110 may include an alignment point 170. The alignment point 170 may be related to a geometric structure of the alignment point 170. For instance, the movable platform 110 may be a vehicle, and the alignment point 170 may be a geometric center of the movable platform 110 in a length direction. For another instance, the movable platform 110 may include a vehicle and a container carried or towed by the vehicle, and the alignment point 170 may be a geometric center of the container in the length direction. The relative positions of the movable platform 110 with respect to the target object 120 may be obtained by the LPS 111, wherein the relative positions of the movable platform 110 with respect to the target object 120 may be the relative positions of the alignment point 170 of the movable platform 110 with respect to the reference point 180 of the target object 120.

In 508, the processing engine 112 may direct the movable platform to move to a target position according to the relative positions of the movable platform with respect to the target object 120. After the relative positions of the movable platform 110 with respect to the target object 120 are obtained by the LPS 111, the movable platform 110 may move to align with the target object 120 based on the relative positions of the movable platform 110 with respect to the target object 120. To this end, while the movable platform is moving, the processing engine 112 may determine a comparison result by comparing a target relative position with the relative position of the movable platform with respect to the target object, and then the processing engine 112 may direct the movable platform to keep moving until the comparison result shows that the target relative position matches the relative position of the movable platform with respect to the target object.

At the target position where the movable platform 110 is finally aligned with the target object 120, the reference point 180 of the target object 120 and the alignment point 170 on the movable platform 110 may form a certain pattern or relationship. For example, as shown in FIG. 1, after the alignment, the reference point 180 of the target object 120 and the alignment point 170 of the movable platform 110 may form a line 190 perpendicular to the target object 120. Accordingly, if the target object 120 is the gantry crane and the movable platform 110 includes a container, and the movable platform 110 is parked at the target position, the crane may lift the container from the movable platform 110 or may directly load a container to the movable platform 110.

The processing engine 112 may establish a reflector coordinate in real-time based on the real-time positions of the plurality of reflectors with respect to the LPS 111, and determine a change of the reflector coordinate in real-time with respect to the LPS 111, then convert the change of the reflector coordinate to the relative positions of the movable platform with respect to the plurality of reflectors. Detailed description related to step 506 may be found elsewhere of the present disclosure (e.g., FIG. 6 and the description thereof.)

It should be noted that the above description of the process for converting a floating-point value into a fixed-point value is provided for the purpose of illustration, and not intended to limit the scope of the present disclosure. For persons having ordinary skills in the art, modules may be combined in various ways, or connected with other modules as sub-systems. Various variations and modifications may be conducted under the teaching of the present disclosure. However, those variations and modifications may not depart from the spirit and scope of this disclosure.

Figure 6:
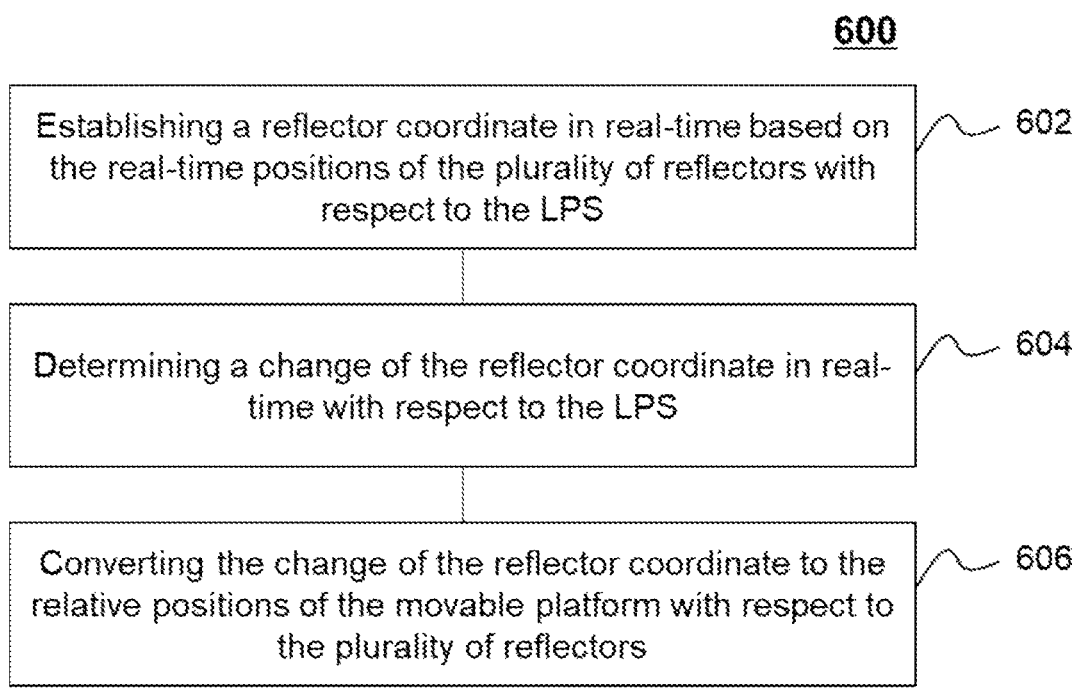
FIG. 6 is a flowchart illustrating an exemplary process for obtaining the relative positions of the movable platform with respect to a target object according to some embodiments of the present disclosure.

FIG. 6 is a flowchart illustrating an exemplary process for obtaining the relative positions of the movable platform with respect to the target object according to some embodiments of the present disclosure. The process 600 may be executed by the system 100. For example, the process 600 may be implemented as a set of instructions (e.g., an application) stored in a storage device (e.g., the ROM 230 or the RAM 240), and invoked and/or executed by the processing engine 112 (e.g., the processor 220 of the computing device 200 illustrated in FIG. 2 and/or the modules and/or units illustrated in FIG. 3 and FIG. 4). The processing engine 112 may execute the set of instructions and, when executing the instructions, it may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In 602, the processing engine 112 (e.g., positioning module 303 in FIG. 3, or the acquisition module 401, establishing module 403 and calculating module 402 in FIG. 4) may establish a reflector coordinate in real-time based on the real-time positions of the plurality of reflectors with respect to the LPS 111. The reflector coordinate may be configured to position the movable platform. The reflector coordinate may be related to positions of the plurality of reflectors. In some embodiments, the reflector coordinate may be related to the actual position of the plurality of reflectors.

The reflector coordinate may be related to the relative position of the plurality of reflectors with respect the LPS 111. The processing engine 112 may select a first reflector and a second reflector from the plurality of reflectors at the first moment. Then the processing engine 112 may establish the reflector coordinate based on the relative positions of the first reflector and the second reflector with respect to the LPS 111. The relative position of the first reflector is the origin of the reflector coordinate of the current time, and X-axis of the reflector coordinate of the current time passes through the first reflector and the second reflector. In some embodiments, the origin of the reflector coordinate of the current time may be the closest reflector to the LPS 111 of the current time.

Figure 7A:
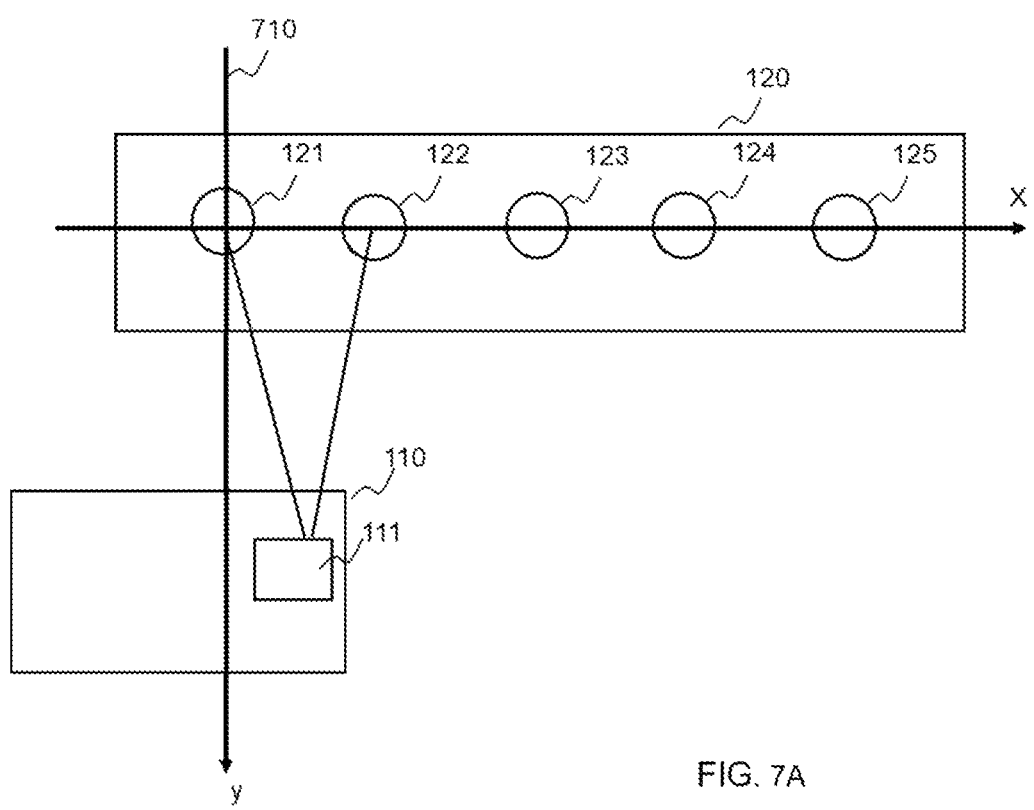
FIG. 7A-7D is a schematic diagram illustrating a reflector coordinate according to some embodiments of the present disclosure.

FIG. 7A is a schematic diagram illustrating a reflector coordinate of the first moment. As shown in FIG. 7A, at the first moment, when the movable platform detects at least two reflectors (e.g., reflector 121 and reflector 122), the processing engine 112 (e.g., positioning module 303) may establish a coordinate 710 with respect to the first moment. The coordinate 710 of the first moment may include an origin which is the relative position of the reflector 121. The X-axis of the reflector coordinates 710 of the current time passes through the first reflector (e.g., reflector 121) and the second reflector (e.g., reflector 122.)

After the movable platform moves for a certain time, the processing engine 112 may select a first reflector and a second reflector from the plurality of reflectors at a second moment. The first moment may be prior to and next to the second moment. Then the processing engine 112 may establish the reflector coordinate based on the relative positions of the first reflector and the second reflector with respect to the LPS 111. The relative position of the first reflector is the origin of the reflector coordinate of the second moment, and X-axis of the reflector coordinate of the current time passes through the first reflector and the second reflector. In some embodiments, the origin of the reflector coordinate of the second time may be the closest reflector to the LPS 111 of the current time.

Figure 7B:
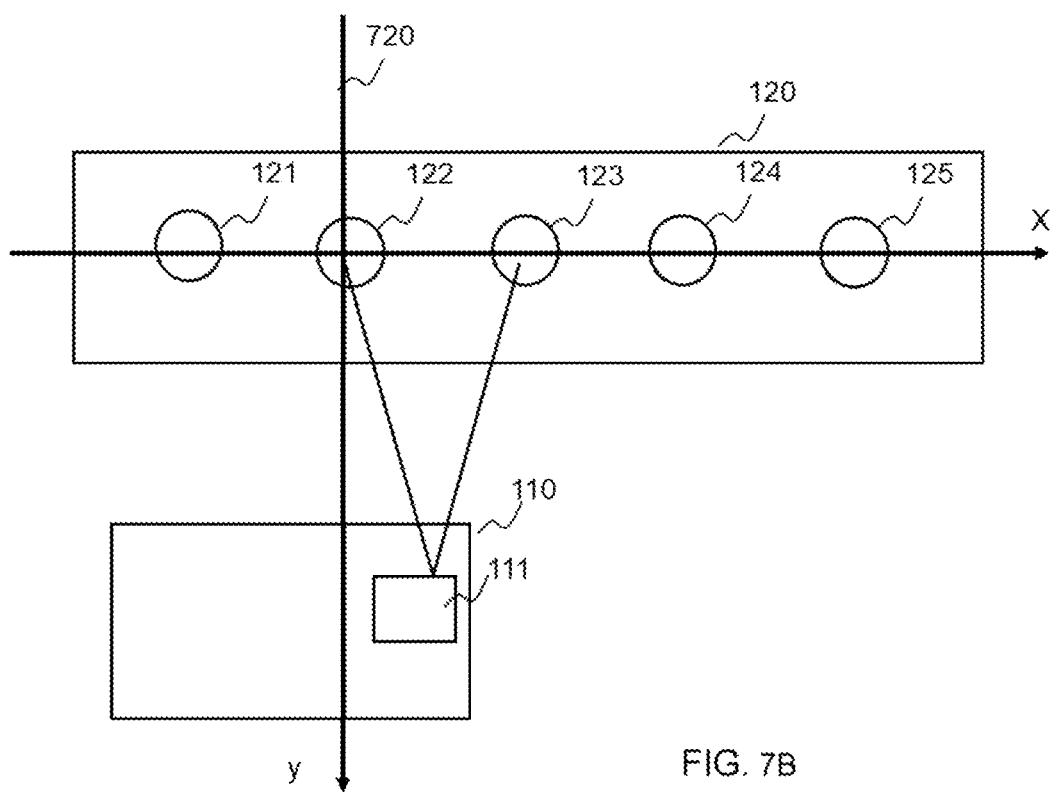

FIG. 7B is a schematic diagram illustrating a reflector coordinate of the second moment. As shown in FIG. 7B, at the second moment, when the movable platform detects at least two reflectors (e.g., reflector 122 and reflector 123), the processing engine 112 (e.g., positioning module 303 in FIG. 3, or the acquisition module 401, establishing module 403 and calculating module 402 in FIG. 4) may establish a coordinate 720 with respect to the first moment. The coordinate 710 of the first moment may include an origin which is the relative position of the reflector 122. The X-axis of the reflector coordinates 720 of the second moment passes through the first reflector (e.g., reflector 122) and the second reflector (e.g., reflector 123.)

In 604, the processing engine 112 (e.g., positioning module 303, in FIG. 3 or the acquisition module 401, establishing module 403 and calculating module 402 in FIG. 4) may determine a change of the reflector coordinate in real-time with respect to the LPS 111. The processing engine 112 may determine the reflector coordinate in current time as a first reflector coordinate, then obtain the reflector coordinate in a moment prior to the current time as a second reflector coordinate; and finally determine the change by comparing the first reflector coordinate and the second reflector coordinate.

The processing engine 112 may compare a position or a direction of the reflector coordinate of the first moment with respect to the LPS 111 and the reflector coordinate of the second moment with respect to the LPS 111 to determine the position or the velocity of the movable platform. For example, as shown in FIG. 7A and FIG. 7B, the processing engine 112 (e.g., positioning module 303 in FIG. 3, or the acquisition module 401, establishing module 403 and calculating module 402 in FIG. 4) may compare a difference between the position information of reflector 121 in the reflector coordinate of the first moment and the position information of reflector 121 in the reflector coordinate of the second moment with respect to the LPS 111. For example, as shown in FIG. 7A and FIG. 7B, the processing engine 112 (e.g., positioning module 303 in FIG. 3, or the acquisition module 401, establishing module 403 and calculating module 402 in FIG. 4) may compare a difference between a direction of the X-axis of the reflector coordinate of the first moment and the direction of the X-axis of the reflector coordinate of the second moment with respect to the LPS 111.

In 606, the processing engine 112 (e.g., positioning module 303 in FIG. 3, or the acquisition module 401, establishing module 403 and calculating module 402 in FIG. 4) may convert the change of the reflector coordinate to the relative positions of the movable platform with respect to the plurality of reflectors.

The processing engine 112 may compare a position or a direction of the reflector coordinate of the first moment and the reflector coordinate of the second moment to determine the position or the velocity of the movable platform. For example, as shown in FIG. 7A and FIG. 7B, the processing engine 112 (e.g., positioning module 303 in FIG. 3, or the acquisition module 401, establishing module 403 and calculating module 402 in FIG. 4) may compare a difference between the position information of reflector 121 in the reflector coordinate of the first moment and the position information of reflector 121 in the reflector coordinate of the second moment to determine the actual position or velocity of the movable platform 110 with respect to a stationary point on the ground. For example, as shown in FIG. 7A and FIG. 7B, the processing engine 112 (e.g., positioning module 303 in FIG. 3, or the acquisition module 401, establishing module 403 and calculating module 402 in FIG. 4) may compare a difference between a direction of the X-axis of the reflector coordinate of the first moment with respect to the LPS 111 and the direction of the X-axis of the reflector coordinate of the second moment with respect to the LPS 111 to determine the actual position or velocity of the movable platform 110. The processing engine 112 may make the above determination by assuming that the motion of the X-axis is known. For example, the direction of the X-axis is in fact stationary.

Figure 7C:
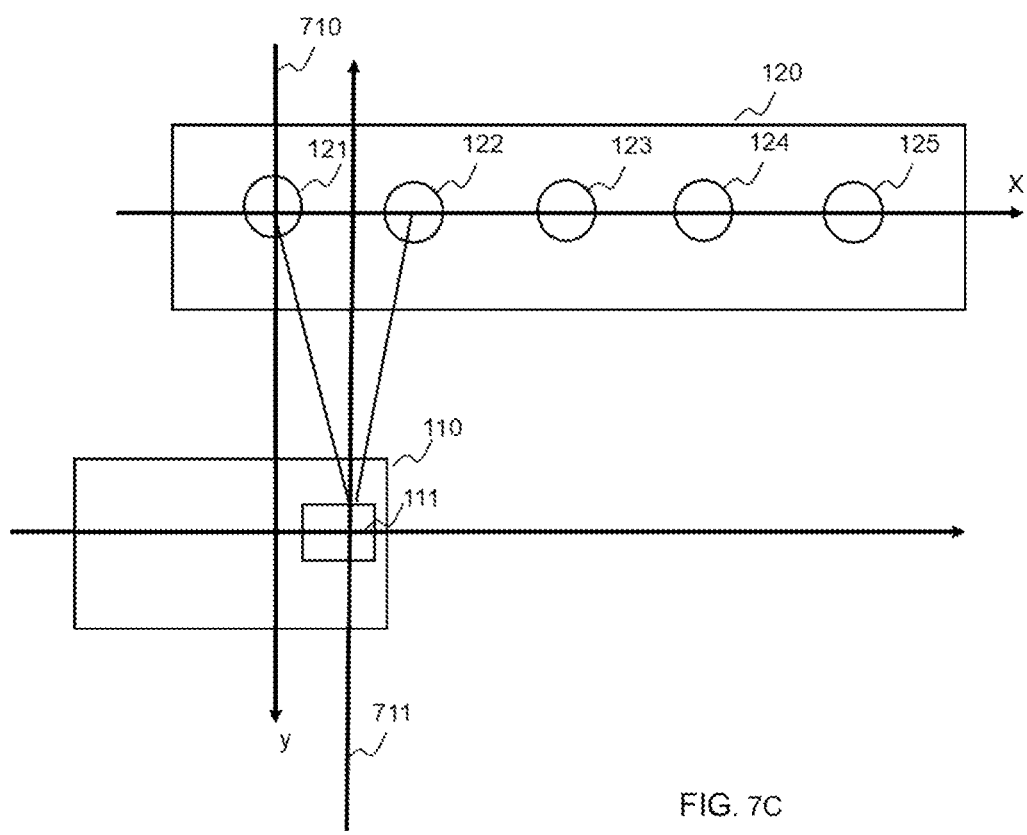
Figure 7D:
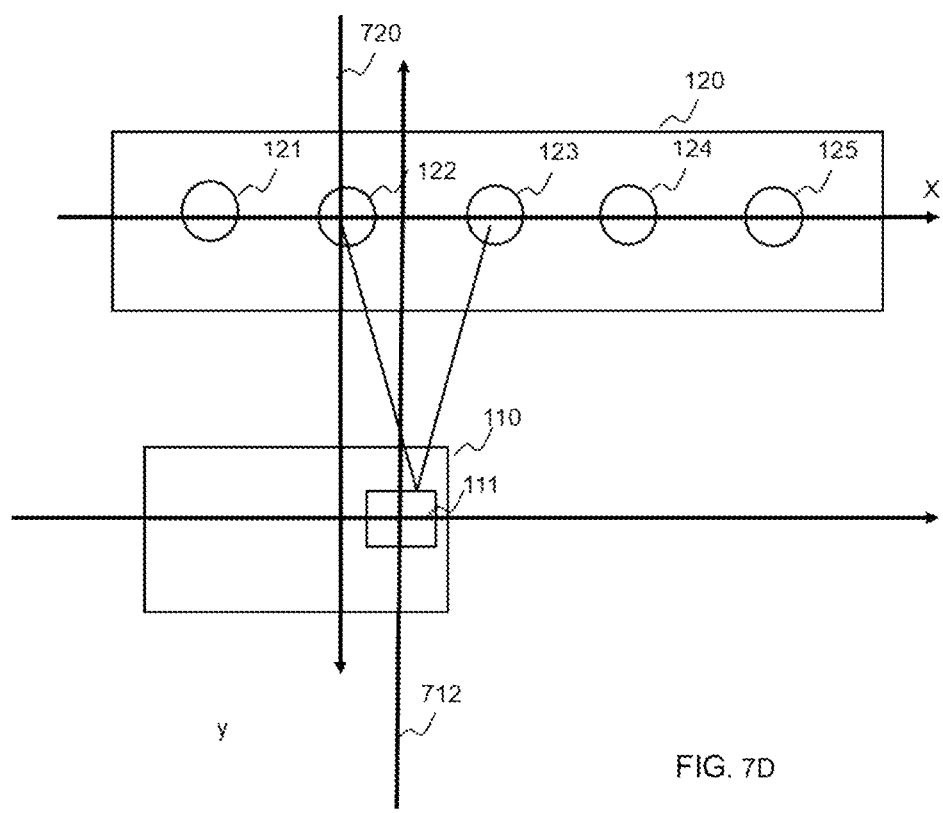

In some embodiments, the processing engine 112 (e.g., positioning module 303 in FIG. 3, or the acquisition module 401, establishing module 403 and calculating module 402 in FIG. 4) may establish an LPS 111 coordinate being a coordinate taking the Lidar 113 (e.g., the processing engine 112) as an origin. For example, as illustrated in FIG. 7C, the processing engine 112 may convert the reflector coordinate of the first moment 710 to the LPS 111 coordinate of the first moment 711. The processing engine 112 may be the origin of the LPS 111 coordinate 711. For another example, as illustrated in FIG. 7D, the processing engine 112 may convert the reflector coordinate of the first moment 720 to the LPS 111 coordinate of the second moment 721. The processing engine 112 may be the origin of the LPS 111 coordinate 721. The processing engine 112 (e.g., positioning module 303 in FIG. 3, or the acquisition module 401, establishing module 403 and calculating module 402 in FIG. 4) may converting the change between the LPS 111 coordinate of the first moment 711 and the LPS 111 coordinate of the second moment 721 to the relative positions of the movable platform with respect to the plurality of reflectors.

It should be noted that the above description of the process for converting a floating-point value into a fixed-point value is provided for the purpose of illustration, and not intended to limit the scope of the present disclosure. For persons having ordinary skills in the art, modules may be combined in various ways, or connected with other modules as sub-systems. Various variations and modifications may be conducted under the teaching of the present disclosure. However, those variations and modifications may not depart from the spirit and scope of this disclosure.

FIG. 8 is a flowchart illustrating an exemplary process for a positioning method for a movable platform according to some embodiments of the present disclosure. The process 800 may be executed by the system 100. For example, the process 800 may be implemented as a set of instructions (e.g., an application) stored in a storage device (e.g., the ROM 230 or the RAM 240) and invoked and/or executed by the processing engine 112 (e.g., the processor 220 of the computing device 200 illustrated in FIG. 2 and/or the modules and/or units illustrated in or FIG. 4). The processing engine 112 may execute the set of instructions and, when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 8 and described below is not intended to be limiting.

As illustrated in FIG. 8, the exemplary process for the positioning method for a movable platform includes the following steps. In 801, the current position information of each reflective pillar relative to the laser device may be obtained via real-time detecting the plurality of reflective pillars preset on the alignment target (e.g., the target object 120 as shown in FIG. 1) to be aligned in real-time by using a laser device (e.g., the LPS 111 as shown in FIG. 1) disposed on the vehicle (e.g., the vehicle 110 as shown in FIG. 1). In 802, the vehicle position of the vehicle with respect to the alignment target (e.g., the target object 120 as shown in FIG. 1) may be obtained based on current position information, the alignment coordinate system of the preset reflective pillar cluster, and the actual position information of each of the plurality of reflective pillars.

It should be noted that the laser device may be a laser radar, and its model may be VLP-16. The laser device may be fixedly mounted on the vehicle, for example, by screws. In the motion of the vehicle, the laser device does not sway relative to the vehicle, and the accuracy of the final vehicle position determination may be improved. The reflective pillar (e.g., one or more of the reflective pillars 121, 122, 123, 124, and 125 as shown in FIG. 1) may be made by winding a cylinder with a material having good reflective properties. The reflective pillar may be disposed on the alignment target (e.g., the target object 120 as shown in FIG. 1). Several reflective pillars may be placed on the alignment target. In some embodiments, the number of reflective pillars is greater than or equal to two. The alignment target is determined based on the actual application scenario and can be an inner-shore bridge of a port, a heap bridge, and a suspension bridge, etc. For example, in the scenario of a suspension bridge, the suspension bridge may be the alignment target. The reflective pillar is placed at a height of 1 to 6 meters from the ground of the suspension bridge. The reflective pillars are arranged on both sides of the suspension bridge, and the total number is greater than or equal to two. This may be good for the control of unmanned vehicles in a port environment, especially container trucks.

Figure 9:
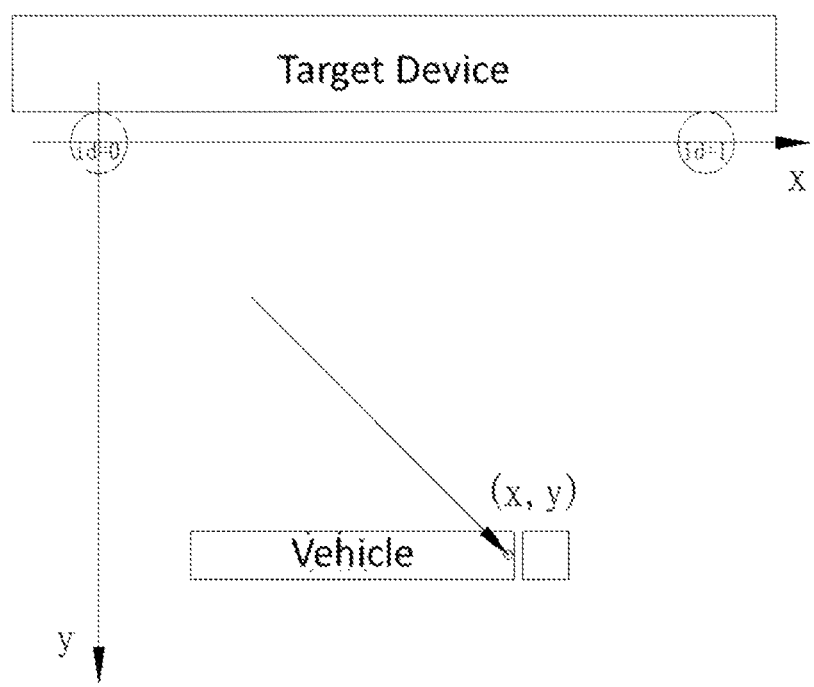
FIG. 9 is a schematic diagram illustrating a reflector coordinate according to some embodiments of the present disclosure.

In the vehicle, the laser device may detect the relative position of the reflective pillars in real-time, that is, calculating the current position information of the reflective pillars with respect to the laser device (e.g., the Lidar 112 as shown in FIG. 1) based on the reflection intensity of the reflective pillars. The real-time position of the vehicle may be determined in real-time according to the current position information, the preset coordinate system of the reflective pillars and the actual position information of each reflective pillar, as shown in FIG. 9. For example, the actual position information of each of the reflective pillars may be obtained either before or after the reflective pillar is actually set, which this application does not intend to limit.

In the vehicle, the laser device detects the relative position of the reflective pillar in real-time, that is, detects the current position information of the reflective pillars relative to the laser device according to the reflection intensity of the reflective pillars. The present disclosure can quickly determine the vehicle position of the vehicle relative to the target in real-time according to the current position information, and satisfy the vehicle itself during the continuous traveling process.

In some embodiments, the preset of the alignment coordinate system of the reflective pillar cluster may include the following steps.

During the movement of the different postures of the vehicle, the laser device acquires the position information of each of the reflective pillars relative to the laser device and the motion state of the vehicle in real-time, and establishes a registration coordinate system based on the position information and the motion state. Presetting the alignment coordinate system can speed up the positioning efficiency, and the alignment coordinate system based on the position information and the motion state can satisfy various vehicle movements and positions to accurately locate the current vehicle.

In some embodiments, the motion of the different poses of the vehicle is a uniform linear motion of the vehicle.

The following is a detailed description of the establishment of the alignment coordinate system, which is the establishment of the alignment coordinate system based on the position information and the motion state, including the following steps.

When the position information of at least two reflective pillars relative to the laser device is obtained for the first time, the reflective pillar closest to the laser device is taken as the origin of the coordinate system, and the other reflective pillar(s) of the at least two pillars are used as other points on the X-axis to help establishing the first alignment coordinate of the current vehicle running position. Each of the reflective pillars in the X-axis coordinate of the current alignment coordinate system is numbered. In other words, the alignment coordinate system of the cluster is initialized when the laser device detects at least two for the first time. The number may be in accordance with the respective positions of each pillar in the X-axis, from the one with a smaller X-axis coordinate value to the one with a larger X-axis coordinate value. For example, the number can be from id=0 to id=n from the origins of the X-axis.

When the position information of the at least two reflective pillars relative to the laser device is obtained again, the reflective pillar closest to the laser device is taken as the origin of the coordinate system, and other reflective pillars of the at least two reflective pillars are used as the other points on the X-axis to help establishing the second alignment coordinate of the current vehicle running position. The Neighbor Algorithm is used to associate the second alignment coordinate system with the first alignment coordinate system according to the current vehicle motion state to obtain a third alignment coordinate system. The motion state of the vehicle may include the direction of the motion, speed, and the like. The association between the second alignment coordinate system and the first alignment coordinate system can be accomplished by means of the nearest neighbors.

During the movement of the vehicle under different poses, the establishment and association of the coordinate system are continuously performed until preset requirements are met to establish the alignment coordinate system so that the alignment coordinate system is able to cover every alignment relationship between the vehicle position and the reflective pillars.

In some embodiments, tracking can be performed during the motion of the vehicle using a Kalman tracking model. If the position information of at least two reflective pillars relative to the laser device cannot be obtained at the same time within a single detection cycle during the course of vehicle motion, the reflective pillar information may be determined as unable be detected and obtained for the detection cycle, and only the motion model of the vehicle is used for status update; if the reflective pillars keep being undetectable non-detectable for a preset m detection cycles, it is considered that the reflective pillars cannot be detected, and record of the current reflective pillars is deleted.

The actual position and radius of the reflector are required, and the radius and height are determined by the parameters of the selected laser device and the maximum applicable distance. In this embodiment, before establishing the alignment coordinate system based on the location information and the motion state, the following steps are further included.

The parameter information of the laser device may be obtained, and the reflective pillar on the alignment target (e.g., the target object 120 as shown in FIG. 1) may be set according to the setting requirements according to the parameter information. There are four criteria in the setting requirements. The first one is that the reflective pillar should be stable and will not shake after fixing. The second one is the horizontal upward. The third one is that the center plane is near the center plane position of the laser device. The fourth point is that the number of reflective pillars is two or more. That is to say, at the maximum applicable distance, the laser device can obtain the current position information of at least three reflective pillars on the alignment target, and each reflective pillar contains 3 current position information. The subsequent alignment coordinates can be improved. The system determines the accuracy of the vehicle relative to the vehicle position of the alignment target. In some embodiments, the retroreflective pillar can be calibrated. Specifically, the radius $r_1, r_2, \ldots, r_n$ of the n reflecting columns and the distance $d_{ij}$ between the center points of the reflecting columns are measured.

Then, after the reflective pillar is set, it needs to be tested to see if it meets the requirements. In some embodiments, specifically, obtaining a reflectivity feature and a distance feature of each of the retroreflective pillars, and performing coarse filtering on the reflectance characteristics according to a preset threshold; the coarse filtering satisfies the following formula:

$$\{P_i | \text{intensity}_i \geq Thr\}$$

$P_i$ may denote the ith cloud point. Intensity$_i$ may denote the reflecting rate of the ith could point. Thr may denote a preset threshold. The preset threshold may be K, and the value greater than or equal to K may be considered to be a reflector suspected area, and value less than k directly is directly filtered out.

The coarse filtered reflectivity features may be filtered according to the distance feature, and cluster the cluster points of each reflective pillar. The finely filtering may be performed based on formula (2)

$$\{P_i | Thr_l \leq \sqrt{x_i^2 + y_i^2 + z_i^2} \leq Thr_h\} \qquad (2)$$

$Thr_l$ may denote a minimum threshold, and $Thr_h$ may denote a maximum threshold, $x_i$ may denote X-axis coordinate of the ith cloud point, $y_i$ may denote y-axis coordinate of the ith cloud point, and $z_i$ may denote z-axis coordinate of the ith cloud point.

The z-axis data for clustering of the XY plane point cloud may be ignored, and only keep the cluster with the distance less than $d_{min}$ and the number of point clouds in the cluster between $c_{min}$ and $c_{max}$. The clustering may be as shown in FIG. 5B before the fine-filtering, after fine-filtering clustering, as shown in FIG. 5C, the reflector can be detected very stably.

A cylindrical fit may be performed on the cluster points of each of the reflective pillars and retains the parameters of the cylinder. The parameters of the cylinder may include a center point ($c_{xi}$, $c_{yi}$, $c_{zi}$), a cylinder center line vector ($c_{vxi}$, $c_{vyi}$, $c_{vzi}$), and a cylinder bottom radius cri. Considering the presence of laser point cloud noise, A random consistent sampling algorithm may be used. The vehicle position is filtered according to the preset Kalman tracking model of the vehicle to obtain the filtered vehicle position. In order to avoid the influence of noise, the uniform linear motion is used as the state update, and the detection of the reflective cluster is used as the observation update, and the filtering result of the real-time position is outputted outward. The positioning accuracy of the vehicle is effectively improved, and the safety and stability of the automatic driving in the port environment are enhanced.

It should be noted that the above description of the process for determining the directed graph is provided for the purpose of illustration, and not intended to limit the scope of the present disclosure. For persons having ordinary skills in the art, modules may be combined in various ways, or connected with other modules as sub-systems. Various variations and modifications may be conducted under the teaching of the present disclosure. However, those variations and modifications may not depart from the spirit and scope of this disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A positioning system, comprising:
   a movable platform;
   a Lidar mounted on the movable platform to detect a plurality of reflectors mounted on a target object while the movable platform is moving, wherein each of the plurality of reflectors includes a reflective pillar; and
   at least one processor mounted on the movable platform and in communication with the Lidar and the movable platform to:

obtain in real-time, according to the current position information, relative positions of the plurality of reflectors with respect to the Lidar by:
  determining a plurality of cloud points for a reflector,
  performing a coarse filtering on the plurality of cloud points to generate a coarse cloud point cluster,
  performing a fine filtering on the coarse cloud point cluster to generate a fine cloud point cluster, and
  determining the position of the reflector based on the fine cloud point cluster, and
obtain a relative position of the movable platform with respect to the target object based on the relative positions of the plurality of reflectors with respect to the Lidar.

2. The positioning system of claim 1, wherein the at least one processor further directs the movable platform to move to a target position according to the relative positions of the movable platform with respect to the target object.

3. The positioning system of claim 2, wherein to direct the movable platform to move to the target position the at least one processor further:
  determines a comparison result by comparing a target relative position with the relative position of the movable platform with respect to the target object; and
  directs the movable platform to keep moving until the comparison result shows that the target relative position matches the relative position of the movable platform with respect to the target object.

4. The positioning system of claim 1, wherein to obtain the relative positions of the movable platform with respect to the target object the at least one processor further:
  establishes a reflector coordinate in real-time based on the real-time positions of the plurality of reflectors with respect to the Lidar;
  determines a change of the reflector coordinate in real-time with respect to the Lidar; and
  converts the change of the reflector coordinate to the relative positions of the movable platform with respect to the plurality of reflectors.

5. The positioning system of claim 4, wherein to establish the reflector coordinate of a first moment the at least one processor further:
  selects a first reflector and a second reflector from the plurality of reflectors; and
  establishes the reflector coordinate based on the relative positions of the placing the first reflector and the second reflector with respect to the Lidar,
  wherein the relative position of the first reflector is the origin of the reflector coordinate of the current time, and an X-axis of the reflector coordinate of the current time passes through the first reflector and the second reflector.

6. The positioning system of claim 5, wherein to establish the reflector coordinate of a second moment next to the first moment the at least one processor further:
  selects the first reflector as an origin of the reflector coordinate of the second moment; and
  selects an axis that passes through the first reflector and the second reflector as the X-axis of the reflector coordinate of the second moment time current.

7. The positioning system of claim 4, wherein to determine the change of the reflector coordinate in real-time with respect to the Lidar the at least one processor further:
  determines the reflector coordinate in a current time as a first reflector coordinate;
  obtains the reflector coordinate in a moment prior to the current time as a second reflector coordinate; and
  determines the change by comparing the first reflector coordinate and the second reflector coordinate.

8. The positioning system of claim 4, wherein to convert the change of the reflector coordinate to the relative positions of the movable platform with respect to the plurality of reflectors the at least one processor further:
  establishes a Lidar coordinate being a coordinate taking a laser radar as an origin; and
  determines the relative change of positions of the Lidar with respect to the corresponding reflector coordinate.

9. The positioning system of claim 1, wherein to obtain of the relative position of the movable platform the at least one processor further:
  filters position of the movable platform by a Kalman tracking model preset by the movable platform; and
  obtains a filtered position of the movable platform.

10. The positioning system of claim 1, wherein the reflective pillar includes at least one laser line including at least one reflecting point generated by the Lidar, the at least one reflecting point represents a position of the reflective pillar, and
  the at least one processor determines the relative position between the movable platform and the reflective pillar based on at least one laser beam reflected to the Lidar corresponding to the at least one laser line.

11. A positioning method for a movable platform, comprising:
  detecting, by a laser positioning system (LPS) mounted on the movable platform, a plurality of reflectors mounted on a target object, wherein the movable platform is moving, and each of the plurality of reflectors includes a reflective pillar;
  obtaining in real-time, by the LPS according to the current position information, relative positions of the plurality of reflectors with respect to the LPS by:
    determining a plurality of cloud points for a reflector,
    performing a coarse filtering on the plurality of cloud points to generate a coarse cloud point cluster,
    performing a fine filtering on the coarse cloud point cluster to generate a fine cloud point cluster, and
    determining the position of the reflector based on the fine cloud point cluster, and
  obtaining, by the LPS, a relative position of the movable platform with respect to the target object based on the relative positions of the plurality of reflectors with respect to the LPS.

12. The method of claim 11, further comprising: directing the movable platform to move to a target position according to the relative positions of the movable platform with respect to the target object.

13. The method of claim 12, wherein the directing of the movable platform to move to the target position includes:
  determining a comparison result by comparing a target relative position with the relative position of the movable platform with respect to the target object; and
  keep moving the movable platform until the comparison result shows that the target relative position matches the relative position of the movable platform with respect to the target object.

14. The method of claim 11, wherein the obtaining of the relative positions of the movable platform with respect to the target object includes:
  establishing a reflector coordinate in real-time based on the real-time positions of the plurality of reflectors with respect to the LPS;
  determining a change of the reflector coordinate in real-time with respect to the LPS; and converting the change of the reflector coordinate to the relative positions of the movable platform with respect to the plurality of reflectors.

15. The method of claim 14, wherein establishing of the reflector coordinate of a first moment includes:
    selecting a first reflector and a second reflector from the plurality of reflectors; and
    establishing the reflector coordinate based on the relative positions of the placing the first reflector and the second reflector with respect to the LPS,
    wherein the relative position of the first reflector is the origin of the reflector coordinate of the current time, and an X-axis of the reflector coordinate of the current time passes through the first reflector and the second reflector.

16. The method of claim 15, wherein the establishing of the reflector coordinate of a second moment next to the first moment includes:
    selecting the first reflector as an origin of the reflector coordinate of the second moment; and
    selecting an axis that passes through the first reflector and the second reflector as the X-axis of the reflector coordinate of the second moment time current.

17. The method of claim 14, wherein the determining of the change of the reflector coordinate in real-time with respect to the LPS includes:
    determining the reflector coordinate in a current time as a first reflector coordinate;
    obtaining the reflector coordinate in a moment prior to the current time as a second reflector coordinate; and
    determining the change by comparing the first reflector coordinate and the second reflector coordinate.

18. The method of claim 14, wherein the converting of the change of the reflector coordinate to the relative positions of the movable platform with respect to the plurality of reflectors includes:
    establishing an LPS coordinate being a coordinate taking a laser radar as an origin; and
    determining the relative change of positions of the LPS with respect to the corresponding reflector coordinate.

19. The method of claim 11, wherein the calculating of the relative position of the movable platform includes:
    filtering position of the movable platform by a Kalman tracking model preset by the movable platform; and
    obtaining a filtered position of the movable platform.

20. The method of 11, wherein the reflective pillar includes at least one laser line including at least one reflecting point generated by the LPS, the at least one reflecting point represents a position of the reflective pillar, and
    the method further comprising:
        determining the relative position between the movable platform and the reflective pillar based on at least one laser beam reflected to the LPS corresponding to the at least one laser line.

* * * * *